United States Patent Office 3,261,710
Patented July 19, 1966

3,261,710
METHOD FOR REMOVING COATING OF EPOXY-PHENOLIC RESIN AND POLYTETRAFLUORO-ETHYLENE FROM METAL CASES
Elmer E. Waldmann, Jefferson, Wis., assignor, by mesne assignments, to The United States of America as represented by the Secretary of the Navy
No Drawing. Original application May 15, 1962, Ser. No. 195,011. Divided and this application Feb. 26, 1963, Ser. No. 270,780
5 Claims. (Cl. 117—49)

This application is a division of copending U.S. application Serial No. 195,011, filed May 15, 1962, now abandoned by the present applicant.

The present invention relates to the removal of coatings from metal surfaces. More particularly the present invention relates to a composition and the manner of using it to remove varnish and polytetrafluoroethylene coatings from metal articles without a substantial loss of metal therefrom.

Cartridge cases for ammunition are presently coated with a varnish such as a modified epoxy-phenolic resin conforming to Specification MIL–V–12276A, Type III. It has been found advantageous to add an additional coat of polytetrafluoroethylene which acts as a dry film lubricant. This latter coat can be applied by spray coating, by dip coating, by flow coating or a one cycle cure by spraying polytetrafluoroethylene directly over the wet varnish and curing the two coats at the same time. The properly cured film has a low coefficient of friction, good heat resistance, good chemical resistance, and is a good electrical insulator. It has been found, however, that various defects can appear in the coats on curing caused by poor adhesion between the coats or between the varnish and the metal, irregular curing, cracks, etc. It would be desirable to be able to salvage the formed metal cases in a condition suitable to be coated again.

Accordingly, it is an object of the present invention to provide a composition for removal of organic coatings from metal objects that is sufficiently economical to warrant the salvaging of the metal object.

Another object of this invention is to provide a method of removing varnishes and polytetrafluoroethylene coatings from shaped metal articles that is quick, efficient and does not result in undue loss of metal.

Another object is to provide a solution for stripping modified epoxy-phenolic coatings that is easily handled without danger and is not unduly toxic.

Other objects and the many attendant advantages of this invention will be readily appreciated as the same becomes better understood in connection with the following description and examples by which the invention is illustrated but not limited.

The stripping solution comprises generally an aqueous solution of an acid, a catalyst and an inhibitor. It was found that 66° Bé. sulfuric acid gave optimum results but this concentration can be varied as time requirements, character of the coating and characteristics of the metal demand. The catalyst can be chromium trioxide in the presence of diphenylamine which will reduce the chromium to the trivalent state and thus stabilize the reaction. Nickel sulfate is also suitable and if used, no diphenylamine is necessary. However, this catalyst is more expensive. Presence of a reducing agent is highly advantageous since epoxyphenolic resins depend on oxidative polymerization. Consequently, the varnish would tend to recure if oxidating agents were present and active. An inhibitor should be present to prevent attack by the acid, the actual stripping solvent, on the metal. Arsenic was found to work but tends to cause discoloration. A pickling acid inhibitor of the type described in U.S. Patent No. 2,403,153 to Saukaitis was found to give excellent results. This inhibitor commonly known as Rodine* is a liquid composition comprising the reaction product of coal tar derivatives selected from the group consisting of pyridine, lutidines, picolines, collidines, quinoline or substituted derivatives thereof with an organic chloride selected from the group consisting of ethylene dichloride, propylene dichloride, dichloroethyl ether, dichloroisopropyl ether, triglycol dichloride, tetraglycol dichloride, benzyl chloride and naphthyl methyl chloride and with a material selected from the group consisting of water soluble thiocyanates and thiourea.

The stripping solution can be prepared according to the following guides. On a gallon basis add A. 1 to 10 ounces of chromium trioxide
B. .2 to 2 ounces per gallon of diphenylamine
C. .1 to 1 fluid ounce per gallon of Rodine
D. Balance 66° Bé. sulfuric acid.

As a functional guide in preparing this solution for optimum results, the stripping power should be such that a properly made solution will remove 0.0004 gram of metal per square inch of surface from uncoated metal over a 30 minute period. A solution meeting these requirements is one containing on a gallon basis:

A. 5 ounces of chromium trioxide
B. 1 ounce of diphenylamine
C. 0.5 fluid ounce of Rodine
D. Balance 66° Bé. sulfuric acid.

This solution was used to remove varnish from 20 mm. steel cartridge cases. The apparatus is not critical nor a part of this invention. It consists of a stripping tank made from Carpenters #20 stainless steel or one lined with acid resistant material. If baskets or racks are used they should also be of acid resistant material. The tank should be electrically or gas heated since steam heat would raise the danger of spattering on contact with the acid and etching of the parts being cleaned. Water would also tend to hydrolyze the resin back to its original form. Since some fumes are given off they should be removed by proper ventilation such as a hood over the tank. The tank need not be agitated. The temperature, though not critical, must be so chosen as to be sufficient to dissolve the resins at an appreciable rate, yet not so high as to cause the solution to attack the metal. Temperatures from 200 to 300° F. have been found suitable, preferably from 250 to 275° F.

The varnished steel cartridge case was immersed in this bath at 260° F. It was found that the modified epoxy-phenolic coating was removed in 2 minutes. The metal case was removed from the bath, immersed in cold running water and rinsed thoroughly to remove acidity.

A steel cartridge case coated with polytetrafluoroethylene over varnish was immersed in the acid bath at 260° F. It was found that the two coatings were completely removed after 5 minutes. Polytetrafluoroethylene is only slightly soluble in this stripping solution but it is sufficiently porous to allow the solution to pass through and dissolve the varnish underneath. This case was also removed from the bath and rinsed in cold water.

These two cases were then cleaned and recoated with varnish. On examination no visual defects or distortions could be discovered. If recoating is not desirable soon after stripping, the stripped parts can be treated with a suitable rust preventive agent such as the grease and oil type available commercially or can be subjected to a chromate conversion coating during the rinsing operation by adding 1 to 5% sodium dichromate and 20% $HNO_3$

---

* Trademark of American Chemical Paint Company.

to the rinse water. The chromate conversion coating could also be applied in a separate tank.

It can readily be seen that this invention provides a safe, economical, non-toxic, effective composition and process for removing organic coatings from metal parts. It is most useful in salvaging defective parts and will save industry and government substantial amounts of money.

Obviously many modifications and variations of the present invention are possible in the light of the above teachings. It is therefore to be understood that within the scope of the appended claims the invention may be practiced otherwise than as specifically described.

What is claimed is:

1. The method of removing a coating of epoxy-phenolic resin from metal cases having also a coating of sufficiently porous polytetrafluoroethylene adhered to said resin comprising:

immersing the cases in a hot bath for a period of time sufficient to completely remove the coatings without resulting in an undue loss of metal;

said hot bath including essentially a solution, on a gallon basis, of from 1–10 ounces of chromium trioxide, from 0.2–2.0 ounces of an antioxidant additive, from 0.1–1.0 fluid ounce of a liquid composition acting as an acid inhibitor;

said acid inhibitor including the reaction product of coal tar derivatives selected from the group consisting of pyridine, lutidines, picolines, collidines, quinoline or substituted derivatives thereof with an organic chloride selected from the group consisting of ethylene dichloride, propylene dichloride, dichlorethyl ether, dichloroisopropyl ether, triglycol dichloride, tetraglycol dichloride, benzyl chloride and naphthyl methyl chloride and with a material selected from the group consisting of water soluble thiocyanates and thiourea; and concentrated sulfuric acid the remaining portion of the bath;

removing the cases from the solution;

rinsing the cases with water; and recoating the cases with a rust preventative agent.

2. The method of claim 1 wherein said antioxidant is diphenylamine.

3. The method of claim 1 wherein the rust preventative agent employed is a grease.

4. The method of claim 1 wherein the rust preventative agent employed is an aqueous chromate solution comprising essentially 1–5% by volume of sodium dichromate and about 20% by volume of nitric acid.

5. The method of claim 1 wherein the rust preventative agent employed is a coating of epoxy-phenolic resin and a coating of polytetrafluoroethylene.

References Cited by the Examiner

UNITED STATES PATENTS

| | | | |
|---|---|---|---|
| 1,314,842 | 9/1919 | Weeks | 204—143 |
| 1,545,498 | 7/1925 | Klinger et al. | |
| 1,877,504 | 9/1932 | Grebe et al. | |
| 2,256,449 | 9/1941 | George. | |
| 2,403,153 | 7/1946 | Saukaitis | 252—149 |
| 2,443,173 | 6/1948 | Baum et al. | 252—127 |
| 2,837,484 | 6/1958 | Sway et al. | 252—100 |

OTHER REFERENCES

Rudner, M. A., Fluorocarbons, Reinhold, New York, 1958, pp. 13–14.

MURRAY KATZ, *Primary Examiner.*

JOSEPH B. SPENCER, *Examiner.*

J. R. BATTEN, JR., *Assistant Examiner.*